United States Patent [19]

Bodine

[11] 4,366,988
[45] Jan. 4, 1983

[54] SONIC APPARATUS AND METHOD FOR SLURRY WELL BORE MINING AND PRODUCTION

[76] Inventor: Albert G. Bodine, 7877 Woodley Ave., Van Nuys, Calif. 91406

[21] Appl. No.: 137,855

[22] Filed: Apr. 7, 1980

Related U.S. Application Data

[63] Continuation-in-part of Ser. No. 12,669, Feb. 16, 1979, Pat. No. 4,252,189.

[51] Int. Cl.³ .................. E21B 7/24; E21B 10/34; E21C 37/04; E21C 37/12
[52] U.S. Cl. .................................... 299/14; 166/177; 175/55; 175/265; 175/267; 175/292; 299/17
[58] Field of Search .................... 299/14, 16, 17; 166/249, 177, 68, 72, 73; 175/65, 56, 55, 267, 292, 265, 325

[56] References Cited

U.S. PATENT DOCUMENTS

| 2,553,541 | 5/1951 | Bodine, Jr. | 175/55 X |
|---|---|---|---|
| 2,670,801 | 3/1954 | Sherborne | 166/249 |
| 2,700,422 | 1/1955 | Bodine, Jr. | 166/249 |
| 2,841,366 | 7/1958 | Dunn | 175/55 UX |
| 2,918,126 | 12/1959 | Bodine | 166/249 |
| 3,189,536 | 6/1965 | Bodine | 166/249 |
| 3,302,720 | 2/1967 | Brandon | 175/56 X |
| 3,360,056 | 12/1967 | Bodine, Jr. | 175/55 |
| 3,384,188 | 5/1968 | Bodine, Jr. | 175/55 |
| 4,109,715 | 8/1978 | Adamson | 299/17 X |

Primary Examiner—Stephen J. Novosad
Attorney, Agent, or Firm—Edward A. Sokolski

[57] ABSTRACT

A well bore is formed which runs down to an underground region having deposits of mineral material to be mined, by installing a casing or a drill pipe into the ground. A piping assembly is placed in the bore hole through the casing and the mineral material comminuted by means of water jet action or by vibratory action of a portion of the piping thereagainst or by both types of action operating simultaneously. The mineral material is mixed with the water in the bore hole to form a slurry which is removed from the bore hole through the piping by sonic pumping action or by virtue of the slurry rising to the surface as the bore hole fills, with oil floating to the top of the slurry material.

34 Claims, 17 Drawing Figures

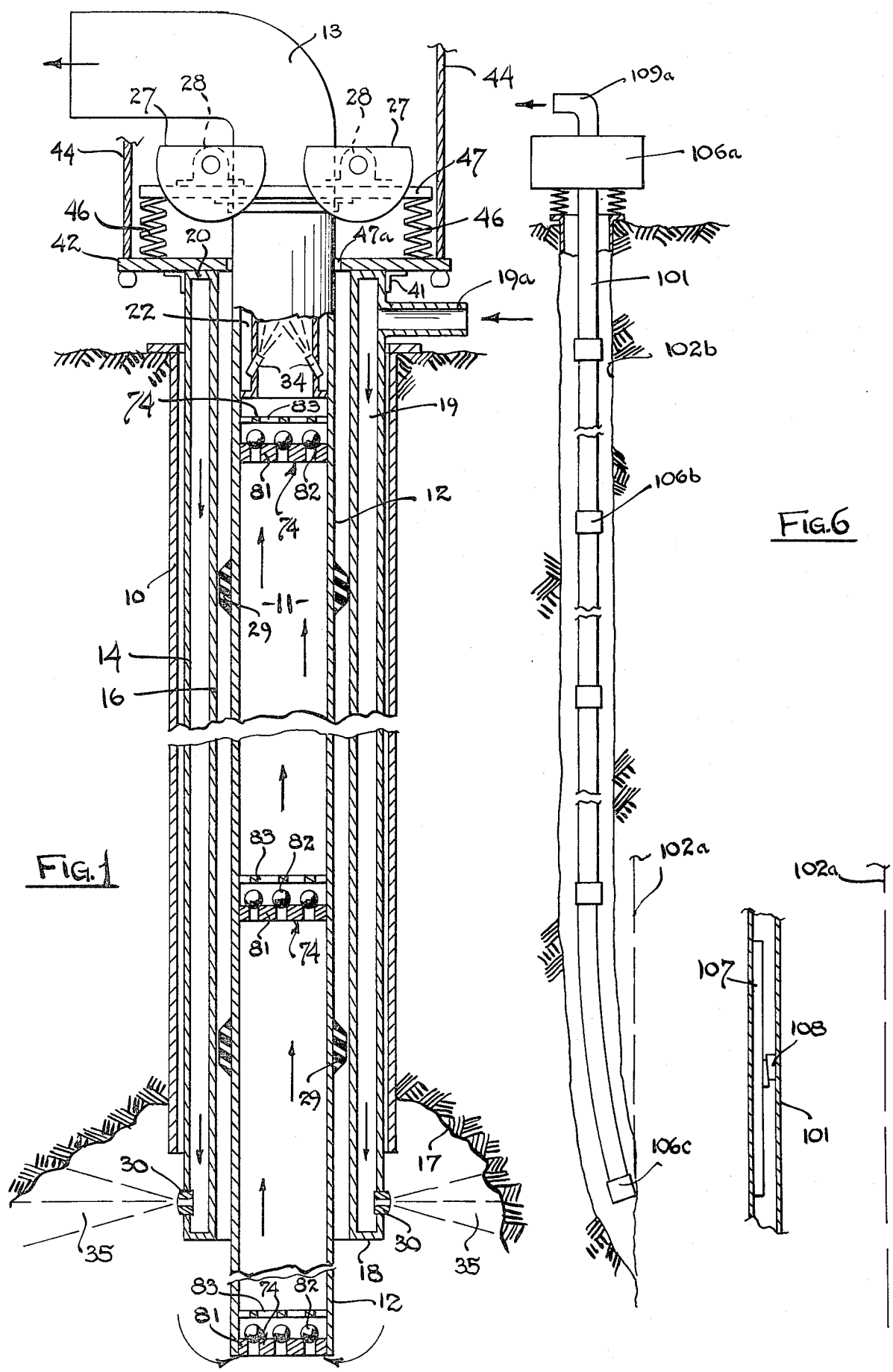

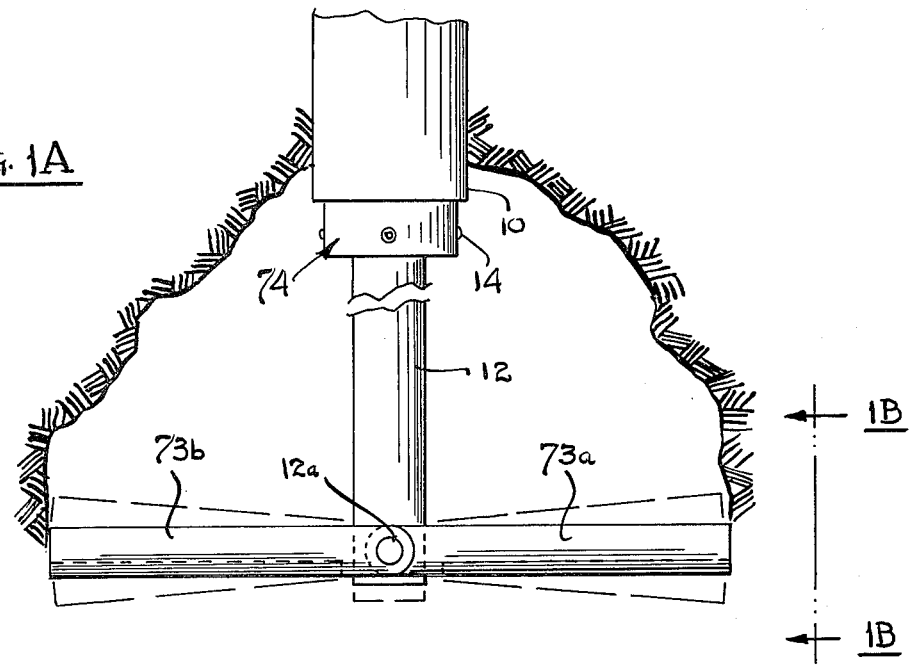
FIG. 1A
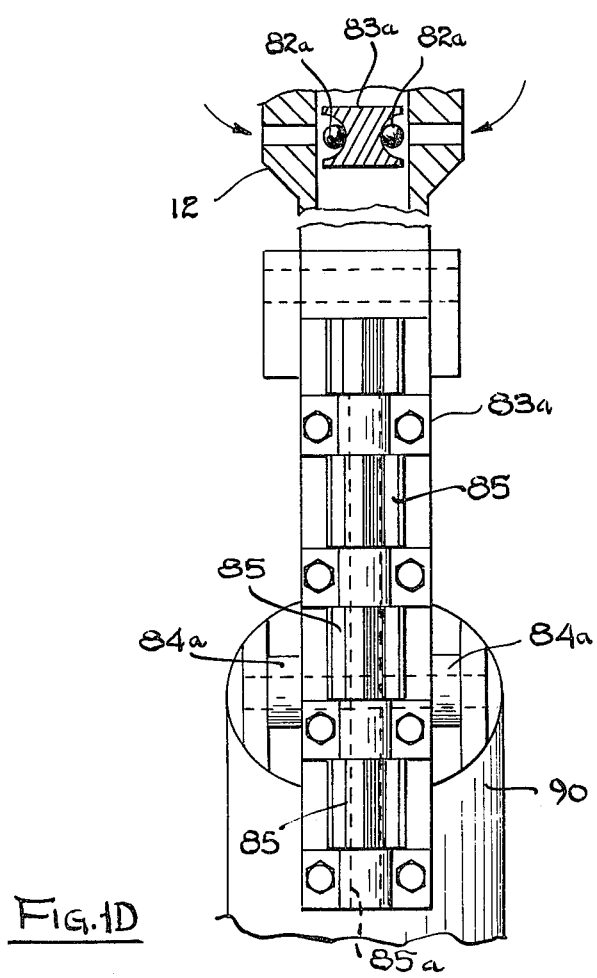
FIG. 1B
FIG. 1D

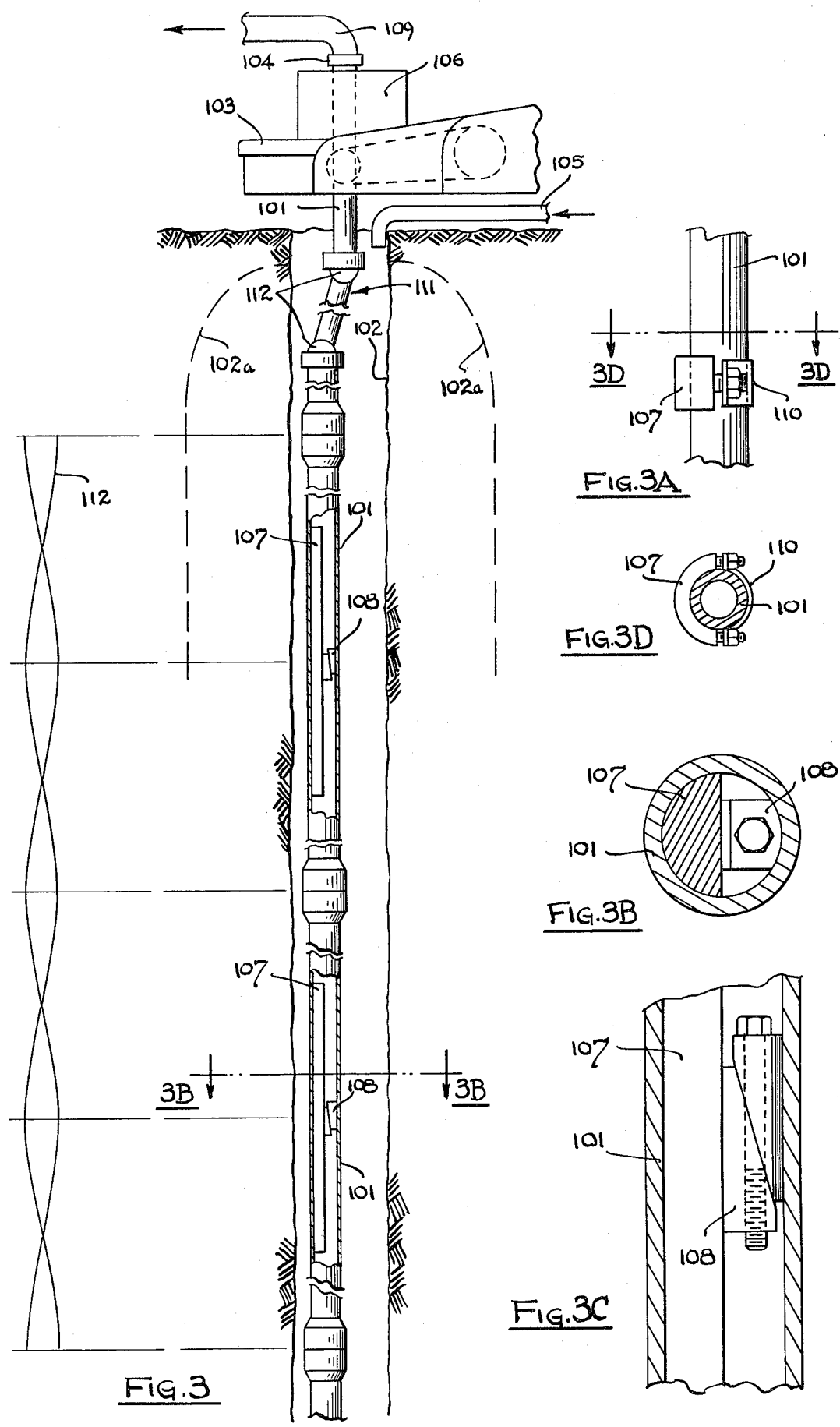

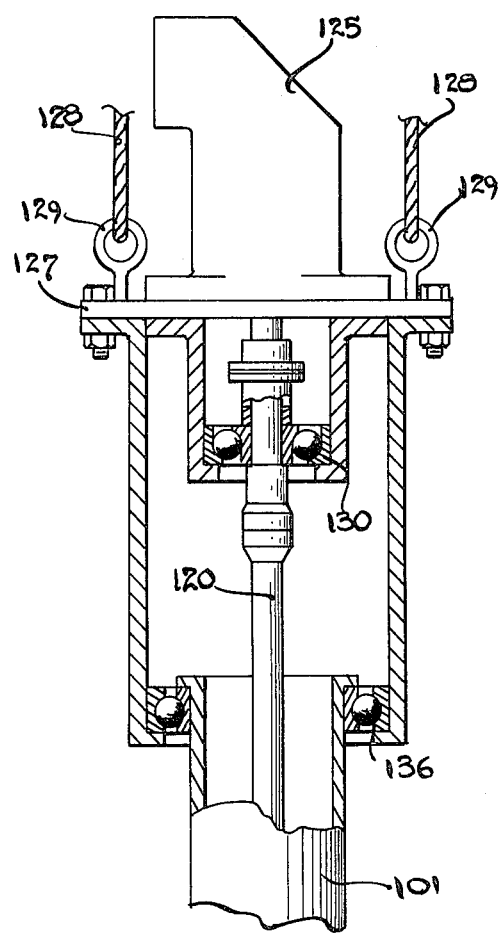
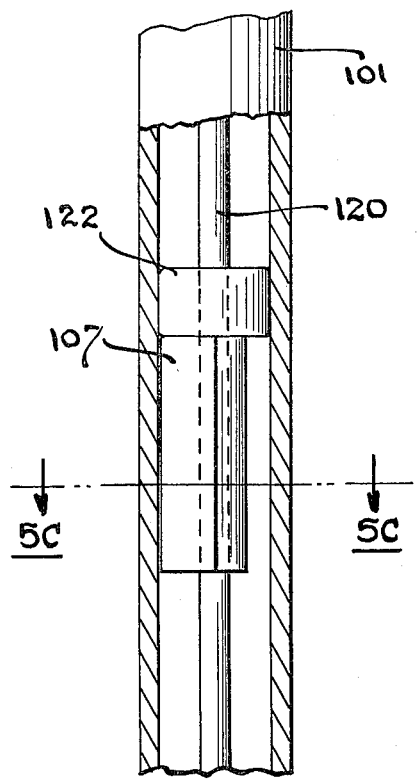
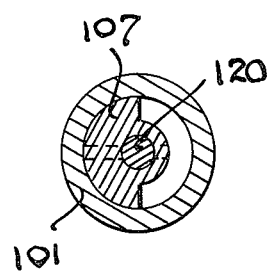
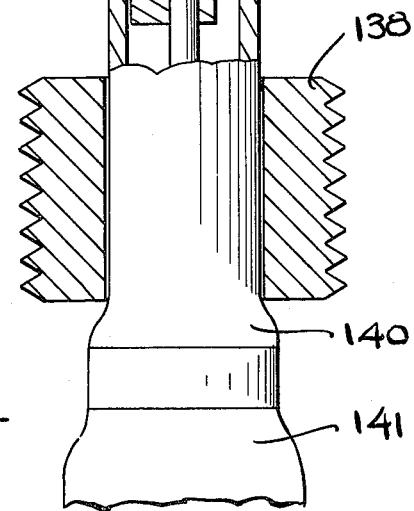
FIG. 5A
FIG. 5C
FIG. 5B mineral bed by impact and erosion and to mix the mineral into a thick slurry. Swinging weight rotors 27 are rotatably driven at a suitable speed such as to induce vertically oriented sinusoidal vibrations in inner tubing member 12, which in turn induces pumping action of the check valve assemblies 72. Such sonic pumping is fully described in my U.S. Pat. No. 3,303,782 and therefore need not again be described herein. As noted in that patent, resonant vibration of the tubing member 12 in a particular manner can be used to optimize the pumping action and minimize fatigue failure.

Swinging weights 27 are preferably of such a size as to cause the impeller valves 82 to have a vertical stroke of the order of ½ inch such that solid particles are driven along with the slurry. The pumping action causes the slurry to be driven up the channel 11 formed by tube member 12 and out through discharge elbow 13 at the top end of the tube member. If so desired, the entire assembly supported on cables 44 can be rotated so as to cause the jets to cut a full circle of the bore hole. Springs 46 function to isolate the vibratory energy from the rest of the system and enable the concentration of the energy in tubing member 12 which, as has been noted, is separated from concentric pipe member 16. Compressed air fed through annulus 22 to nozzles 34 may be emitted through these nozzles to augment the pumping action. A foaming agent may also be placed in the air-stream to convert the slurry in channel 11 into a froth which is relatively light and can more easily be lifted to the top of the bore hole.

Referring now to FIGS. 1A and 1B, the cutting action can be enhanced by employing a pair of sonic cutting bars 73a and 73b which are pivotally supported by means of hinge pins 12a which extend from the bottom end of tubing member 12. The two bars are vibratorily driven by the vibratory energy in the tubing member and transmit this vibratory energy into the mineral bed, thus contributing to the comminution thereof. Arms 73a and 73b are trough-shaped so that they will fold up along the sides of tubing member 12 for movement within pipe member 16 during the installation of the tubing member. With the tubing member 12 sufficiently lowered, the top ends of bar members 73a and 73b will come out from pipe member 16 and gradually fall into the positions shown in FIG. 1A while cutting away at the sides of the bore hole into the mineral material.

Tubing member 12 can be slowly rotated by means of cables 44 to cut out a large, spherical cavity in the mineral. This cavity can be extended downwardly by gradually lowering cables 44 as the sonic action is continued. It is noted that vibratory arm members 73a and 73b may be quite long (100 feet or more) so that a rather large diameter cavity can be excavated. The action of vibratory arm members 73a and 73b is particularly significant if a very hard mineral material is involved in which case the sonic vibratory crushing action of the arm members provides more powerful working action than the hydraulic jets. It is further to be noted that the vibratory action can be continued until arms 73a and 73b swing downward alongside each other in parallel relationship, thus facilitating their removal from the bore hole. This type of vibratory cutting action is fully described in my co-pending application Ser. No. 12,669, filed Feb. 16, 1969, now U.S. Pat. No. 4,252,189, of which the present application is a continuation-in-part.

Referring now to FIG. 2, a second embodiment of the invention is illustrated. This embodiment is generally similar to the first except for the fact that the inner tubing forms the channel for the pressurized water intake and the outer channel formed by the outer concentric pipes is used for pumping the slurry out of the bore hole. Inner tubing member 15 is suspended in the bore hole by means of cable 50 which is connected to bale 15a attached to intake elbow 15b at the top end of the tubing member, the cable being suspended from a crank or derrick. The tubing member 15 fits through an aperture formed in platform 47. Tubing member 15 has a jet nozzle 32 at the lower end thereof from which the pressurized water fed into intake elbow 15b is emitted in the form of a cutting jet 35. The outer passageway 11 which is formed by concentric pipes 12a and 12b which are joined together by a slotted annulus 18 welded thereto is used to carry the slurry up to the surface where it is emitted through pipe portion 13.

The slurry is raised to the surface by means of a sonic pump as in the previously described embodiment, this pump having a pair of eccentric rotors 27 which are rotatably driven to impart vibratory energy to pipe members 12a and 12b. The rotors 27 are rotatably supported on platform 47 which is spring mounted by means of springs 46 on annular ledge member 10a attached to the top edge of casing 10. The pumping check valves 47 are somewhat different in configuration from those of the first embodiment and employ doughnut-shaped valve members 82a which fit in annular grooved seats 74a formed in the check valve. Otherwise the operation is the same as that described for the first embodiment with the valves being opened and closed in response to the sonic energy so as to effectively pump the slurry up to the surface and out through outlet member 13.

It is to be noted that in view of the fact that central tubing member 15 is freely supported within the structure formed by pipe members 12a and 12b, the vibratory energy is not transmitted to this tubing member and rather is concentrated in the outer pipe members which contain the pumping valves. Central tubing member 15 could, if so desired, be clamped solidly to outer concentric pipe members 12a and 12b so that it vibrates along with these outer piping members. In fact, tubing member 15 may in the combination function also as pipe member 12b. Therefore, cable 50 may be of a resilient material so as to suspend and isolate the total vibratory system and thus eliminate the need for springs 46 and flange 102. Rotation of the total vibratory system helpfully, by the Bernoulli effect engendered by the rotary velocity, tends to migrate said total system and nozzle 32 closer to the wall of the bore, thus aiding the cutting action of jets 35.

In certain instances it may be helpful in both the embodiments of FIGS. 1 and 2 to install an air conduit which runs along the slurry pumping channel 11, this conduit having nozzles 34 spaced therealong which can be used to introduce air and/or a foaming agent to aid in the slurry transport.

Referring now to FIGS. 1C and 1D, an alternate type of cutter arm structure to that shown in FIG. 1A is illustrated. This structure includes a pair of arms members 83a and 83b which are pivotally supported on the bottom of tubing member 12. The arms have a plurality of roller cutters 85 rotatably supported therealong on journal type bearings 85a. Roller cutters 85 have cutting teeth 85b for cutting the earthen material in response to the vibratory energy transmitted thereto. Pivotally suspended on arms 83a and 83b by means of bar members 84a and 84b respectively is a cylinder member 90 having

SONIC APPARATUS AND METHOD FOR SLURRY WELL BORE MINING AND PRODUCTION

This application is a continuation-in-part of my Application Ser. No. 12,669, filed Feb. 16, 1979, now U.S. Pat. No. 4,252,189.

There are a number of situations where it is impracticable to use conventional mining operations in removing mineral material such as oil or metals. These include situations where the depth is too great or the amount of material retained in the earth is too small to justify the expense of removing large amounts of overburden soil as in open pit mining, or by techniques which involve the sinking of underground shafts with elevators, conduits, etc. Also, there are many heavy oil operations where the crude oil cannot be conventionally pumped. The use of sonic energy to facilitate such mining operations has been successfully employed and is described in my U.S. Pat. Nos. 3,189,092; 3,189,536; 3,578,081; and 3,848,672.

The apparatus and method of the present invention employs a unique slurry and vibration mining system which is highly economical as compared with most conventional mining techniques and avoids the need for drawing large amounts of earthen material from the ground which might cause subsidence and disfigurement of the terrain.

This improvement is achieved in the system and technique of the present invention by first driving a bore hole through the overburden down to the zones where the mineral lies. This may be achieved by a conventional well drilling technique or by employing a sonic pile driver to drive an oil well casing into the ground or by using vibratory energy to drive a drill pipe into the ground which comminutes the material around the enlarging side wall of the bore hole as it drills outwardly into the ground. Water is then fed into the bore hole down to the mineral zone and the mineral is then comminuted in a first group of embodiments of the invention by means of water jet action and in other embodiments of the invention by driving tubing or pipping placed in the bore hole vibratorily so as to separate the mineral from the earthen formation in which it is retained. The mineral material is combined with the water to form a slurry. This mineral containing slurry is then removed from the bore hole through the tubing by means of sonic pumping action.

It is therefore an object of this invention to facilitate the mining of heavy oil.

It is a further object of this invention to provide an apparatus and technique for mining mineral material which is more economical than prior art techniques.

It is still a further object of this invention to provide a system and technique for mining mineral material through a bore hole that avoids removal of large amounts of earthen material from the ground and in which any such material removed from the ground can be readily replaced so as to minimize the danger of subsidence.

It is still another object of this invention to provide a system and apparatus for mining minerals in which abuse to the terrain is minimized.

Other objects of this invention will become apparent as the description proceeds in connection with the accompanying drawings of which:

FIG. 1 is an elevational view in cross section illustrating a first embodiment of the invention;

FIG. 1A is a cross-sectional view illustrating a vibratory comminuting device which may be employed in the first embodiment;

FIG. 1B is a view taken along the plane indicated by 1B—1B in FIG. 1A;

FIG. 1D is an end elevational view of the device of FIG. 1C;

FIG. 3 is an elevational view in cross section of a third embodiment of the invention;

FIGS. 3A and 3C are drawings illustrating details of portions of the embodiment of FIG. 3;

FIG. 3B is a cross-sectional view taken along the plane indicated by 3B—3B in FIG. 3;

FIG. 3D is a cross-sectional view taken along the plane indicated by 3D—3D in FIG. 3A;

FIGS. 5A and 5B are cross-sectional views of a further embodiment of the invention;

FIG. 5C is a cross-sectional view taken along the plane indicated by 5C—5C in FIG. 5B; and FIG. 6 is an elevational view in cross section of a modification of the embodiment of FIG. 3 employing a separate sonic pumping mechanism.

Figure 1C:
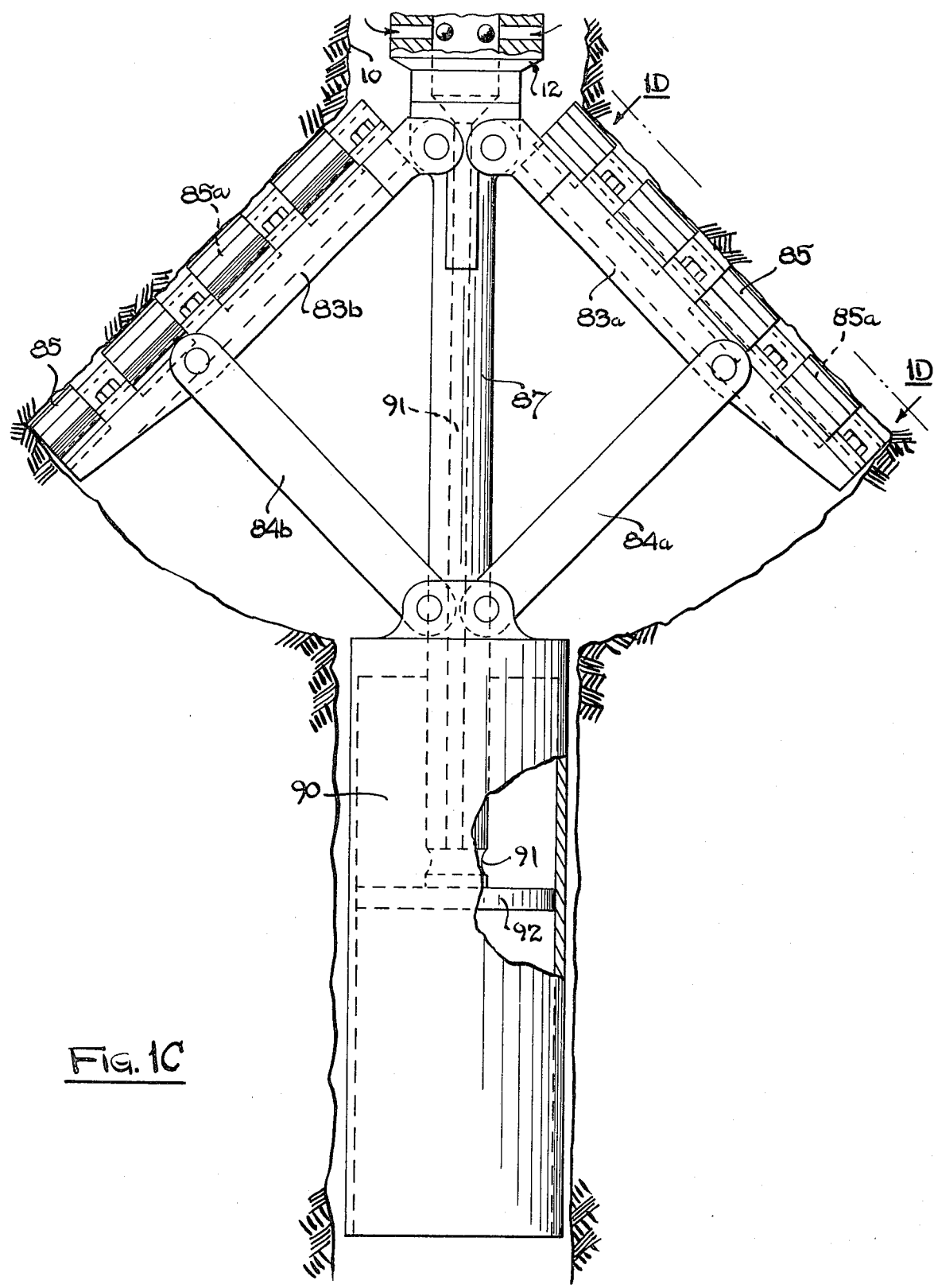
FIG. 1C is a side elevational view of a second device which may be employed in the first embodiment to vibratorily comminute the earth containing material.
Figure 2:
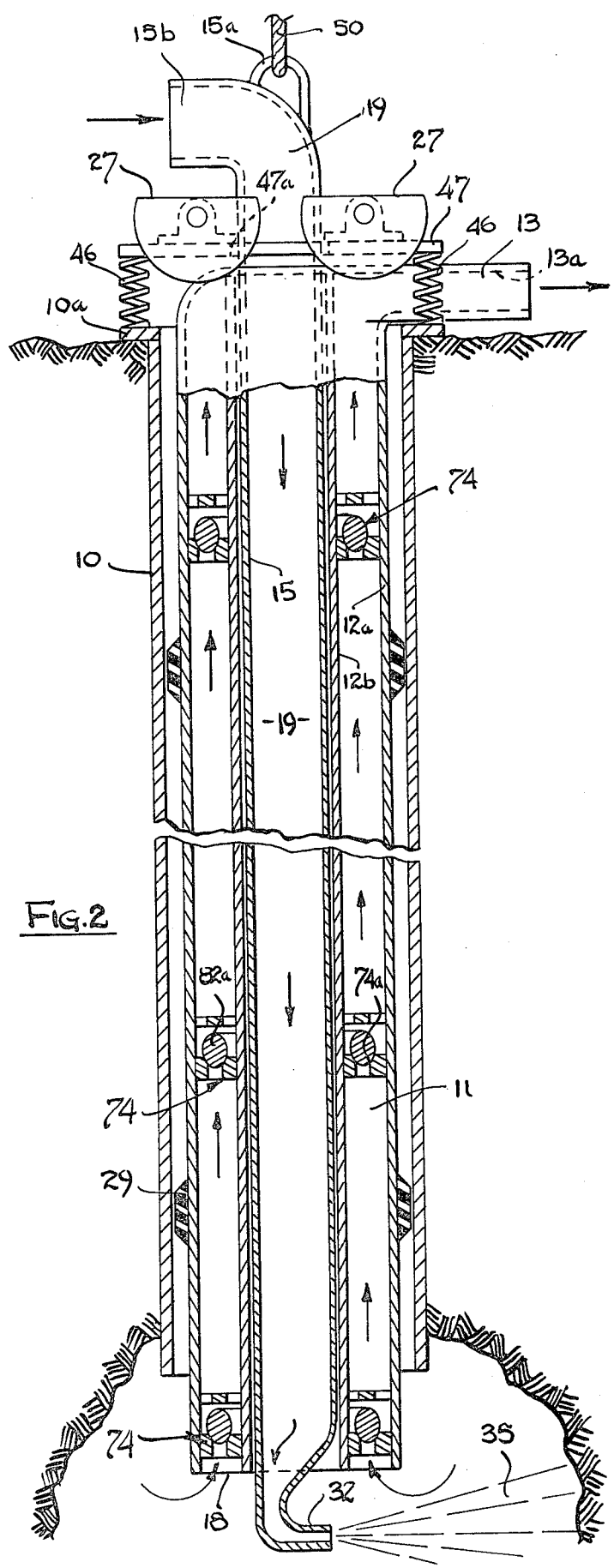
FIG. 2 is an elevational view in cross section of a second embodiment of the invention.

Referring now to FIG. 1, a first embodiment of the invention is illustrated. Concentric pipes 14 and 16 are welded together through the intermediary of annular members 18 and 20 at their bottom and top ends respectively. Casing member 10 is driven or installed into the ground through the overburden earth and down to the mineral bed 17 by suitable means such as a sonic pile driver as described in my U.S. Pat. Nos. 3,848,672 and 3,684,037. Platform 42 is attached to the top end of pipe 14 by means of bracket member 41. Platform 47 is supported on platform 42 on spring mount 46, platform 47 having a pair of swinging weight members 27 which are semi-circular in form mounted thereon. Swinging weight rotors 27 are rotatably driven by suitable motive drive means (not shown). Suspended from platform 47 is a tube member 12, tube member 12 being spaced from pipe member 16 by means of annular rubber separator members 29. Tube member 12 fits through opening 47a formed in platform 47. A plurality of valve members 74 are spaced along tube member 12, these valve members having a plurality of ball valves 82 which are seated in apertured portions of valve plate 81 and which are retained by means of an upper plate 83. The entire assembly formed by pipe members 14 and 16, platforms 42 and 47 and components mounted thereon and tubing 12 are lowered down within casing 10 by means of a crane or derrick from which cables 44 are suspended. As shown in FIG. 1, this assembly is lowered down to the region of the mineral bed and suspended in this area from the crane.

A pair of oppositely positioned water jet nozzles 30 are installed in the bottom of the wall of pipe member 14. Water under high pressure is fed into the annulus 19 formed between pipes 14 and 16 through inlet 19a, this water being ejected out through nozzles 30 to provide high pressure water jets 35 which act to excavate the a piston 92 slidably mounted therein, this piston being supported from tube member 12 by means of cylindrical shaft member 87 which is fixedly attached to the tube member and has a passageway 91 formed in the central portion thereof. Tube member 12 has side inlet sonic pump valves 82a, with ball keeper 83a, as shown in FIG. 1D, communicating with passage 91. The bottom of cylinder 90 is open. Fluid pressure in passage 91 below inlet valves 82a is forced downwardly in passageway 91 and drives piston 92 downwardly. This results in an upward motion of cylinder 90 relative to shaft member 87 which results in the upward actuation of bars 84a and 84b which in turn drive arms 83a and 83b upwardly. With sonic vibratory energy being applied to tube member 12 and arms 83a and 83b, as described in the embodiment of FIG. 1, and with rotation of these members by means of turning tube member 12, roller cutters 85 rotate and vibrate and cut against the side wall of the bore hole. As this is occurring, arms 83a and 83b are constantly being urged against the side of the bore hole by the action of bars 84a and 84b in response to cylinder 90. Thus, as the hole is enlarged, the arms move upwardly towards a horizontal position. As this upward motion continues, tube member 12 can also be raised upwardly to permit continued movement of arms 83a and 83b towards a horizontal position. In this manner, the roller cutters 85 are sonically actuated vigorously against the roof of the enlarged hole with tube member 12 being elevated upwardly while the arms 83a and 83b are simultaneously vibrated and rotated. An enlarged bore hole thus can be elongated upwardly with the cuttings being vibrated in the presence of the slurry, the vibratory action extracting the mineral material from the formation and the cuttings so that they mix with the slurry. With this process, a large part of the spent cuttings are left in the bore hole, thereby minimizing subsidence of the earth, the slurry which is pumped up tubing 12 being quite rich in mineral material, such as oil.

It is to be noted that an entire area can be mined in this fashion by successively sinking bore holes at various locations and repeating the various operations which have been described.

Referring now to FIGS. 3 and 3A-3D, a further embodiment of the invention is illustrated. This embodiment employs a vibratory side wall comminuter for comminuting the mineral material from the side walls of a bore hole as it continually enlarges the diameter of the bore, as indicated at 102a. The device includes a drill pipe 101 which is suspended from table 103 in the bore hole 102 which has been formed by suitable means, such as sonic drilling or otherwise. Water may be fed into the bore hole through pipe 105. Table 103 is a conventional rotary table which is driven in rotation by a conventional drive and is shown schematically in the illustration. Eccentric weight members 107 are mounted within drill pipe 101 by means of mounting fixtures 108 as best can be seen in FIGS. 3B and 3C. FIGS. 3A and 3D illustrate an alternative configuration for the eccentric weight members 107, which in this instance are clamped to the external wall of the piping by means of U-clamps 110. Universal coupler 111 may be used to interconnect rotary table 103 and drill pipe 101, this coupler having a pair of ball joints 112 to facilitate the ever increasing radius of orbital rotation of the drill pipe around the sides of the bore hole. This type of coupling is particularly useful in situations where high lateral displacement of the drill pipe is needed where the petroleum material runs almost to the surface, a good example of this being diatomaceous oil reservoirs. The unbalanced weights 107 cause the generation of radial or lateral vibratory energy in the drill pipe, the speed of rotation of the pipe preferably being adjusted to set up resonant lateral standing wave sonic vibration thereof, as indicated by wave pattern 112. This may be a vibration in quadrature, one pattern as shown in the plane of the drawing, and another lateral pattern in a plane normal to the drawing, so as to result in an orbiting vibration in the nature of a skip-rope.

A sonic pump 106 of the type shown and described in connection with FIG. 1, but here shown schematically, is mounted on platform 103 with check valves (not shown) being placed at selected positions along the pipe of the type also described in connection with FIG. 1. Fluid is outletted at the surface through outlet elbow 109 which is connected to the pump by means of a slip ring coupling 104. This pump energy may also be connected to provide additional sonic energy to drill pipe 101, the frequency of operation of sonic pump 106 being synchronized with that of rotary table 103 so as to make the vibrational energy fed to the drill pipe have more directions of cutting action. The vibratory energy in the drill pipe, as the orbiting rotation traction migrates it around the wall of the fluid filled cavity, provides vibratory treatment all over the wall surface to continually enlarge the bore hole diameter and comminute the mineral material and form it into a slurry which can be pumped to the surface, as described in the previous embodiments. It is to be noted that the vibratory drill pipe uniquely tends to cling forcibly to the wall of the bore hole as it rotates orbitally with a Bernoulli effect around in the fluid filled cavity, causing the radial enlargement of said cavity by strong contact of vibration, with the slurry material between the wall of the drill pipe and the bore hole being very effectively treated, and with low gravity material, such as petroleum, floating upward in the heavier medium such as mud, by the orbital stirring effect of the drill pipe. Thus, in certain situations where the bore hole is filled with liquid right up to the surface, the oil may be floated to the surface without the need for a pump. One preferred arrangement for developing stronger vibration against harder formations is to space the unbalanced weights at lateral wave antinodal positions and then adjust the speed of rotation so as to attain a resonant lateral bending mode of vibration of the drill pipe. It is to be noted that the resonant frequency of lateral vibration is also affected by the tension of the hanging drill pipe which is a function of the length of this pipe.

A suitable detergent may be added to the water in the bore hole which in the presence of the sonic energy tends to aid in loosening mineral material from the earthen material in which it is entrained.

Figure 4:
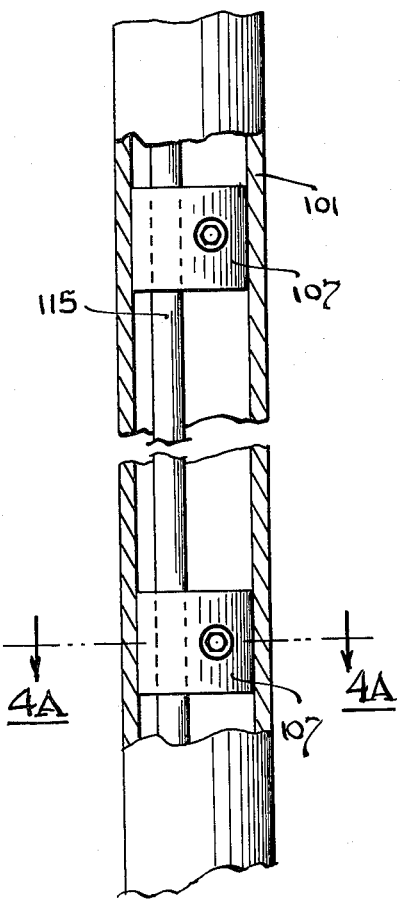
FIG. 4 is an elevational view in cross section of a modification of the drill pipe structure of the embodiment of FIG. 3.
Figure 4A:
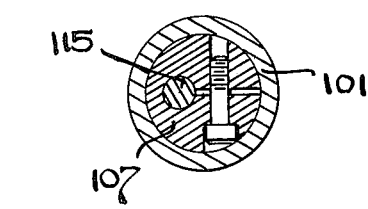
FIG. 4A is a cross-sectional view taken along the plane indicated by 4A—4A in FIG. 4.

Referring now to FIGS. 4 and 4A, a modification of the just described embodiment of the invention is illustrated, this modification employing a sucker rod 115 being lowered into the drill pipe 101 after it is installed, the sucker rod having eccentric spacers 107 removably clamped thereto. In this manner, the circumferential location in the drill pipe of the eccentric weight effect of the sucker rod mass can be changed as may be desired during the operations to achieve optimum results.

Referring now to FIGS. 5A, 5B and 5C, a further modification of the embodiment of FIG. 3 is illustrated to provide a much higher sonic frequency of vibration for the drill pipe 101 than the rotation speed of this drill pipe. This embodiment has eccentric weight members 107 supported for rotation within the pipe, in this instance by virtue of their attachment to a sucker rod drive shaft 120 which is centered within the pipe by means of a plurality of sleeve bearings 122. Sucker rod drive shaft 120 is rotatably driven by an hydraulic motor 125 supported on platform 127 which in turn is suspended from a crane or derrick by means of cables 128 attached to bolts 129. The sucker rod 120 is rotatably supported near its top end on ball bearing 130 and, as already noted, along its length, centered on bearings 122. Drill pipe 101 is suspended from platform 127 on a swivel bearing 136. Thus, the eccentric weights 107 can be driven at a relatively high speed to provide higher frequency vibration of the pipe while the pipe can be rotated on its swivel mount at a lower speed. Side wall cutter members 138 may be spaced along drill pipe 101 to implement the cutting action against the bore hole wall. Additionally, a conventional rotary drill bit 141 attached to tool joint 140 may be employed at the bottom of the drill pipe.

Typically, rod 120 is driven at a speed such as to set up radial sonic vibration of drill pipe 101 at a frequency of the order of 100 Hz which may be a resonant lateral frequency at 101. With the drill pipe suspended from a free turning rotary table, it will tend to rotate at a slow rate in view of the frictional drag of the bushings 122 carrying the fast turning shaft 120. the drill pipe may also be rotated slowly and conventionally by means of passing through a rotary table as shown in FIG. 3, with swivel platform 127 above said rotary table. This rotation is at a very slow speed orbiting around the wall of the bore hole with the object of subjecting the full 360 degrees of the portions of the ever enlarging bore hole being operated on to the vibrational energy. A typical rotation speed for the drill pipe is 150 r.p.m.

In the case of deep wells, the flexibility of the drill pipe is usually sufficient to accommodate the off-set of the stem as it rolls around the enlarged bore hole 102a obviating the need for a swivel joint such as shown in FIG. 3. In shallower wells, a swivel universal drive joint, as shown in the embodiment of FIG. 3 (universal joint 111), may be employed to facilitate side wall mining of the bore hole. In either arrangement, the freedom of lateral displacement permits the combination of vibration and orbital rotation to in effect "suck" the vibrating column against the bore hole wall.

Referring to FIG. 6, when using the system of FIGS. 5A, 5B and 5C as a modification of the embodiment of FIG. 3, it is desirable in some earthen formations to have the oscillator 106a and its tubing 101 (here shown schematically) performing the slurry pumping function by means of check valves 106b and 106c up a parallel or subsidiary well bore 102b connected to the bottom of the main bore 102a as shown in FIG. 3. The sonic pump tubing 106b is fairly flexible and thus will assume a bent configuration as shown. In this manner, the sonic pump need not be embodied within the bore hole mining mechanism of FIGS. 5A, 5B and 5C. Moreover, the slurry is thus pumped from a low point in main well bore 102a as the latter enlarges. The intake valve 106c of the pump may be retracted, as the bore hole 102a enlarges, by raising the pump string 106b. Subsidiary bore 102b is drilled in this slant-wise manner by conventional whip-stock or deflected rilling technique.

While the invention has been described and illustrated in detail, it is to be clearly understood that this is intended by way of illustration and example only and is not to be taken by way of limitation, the spirit and scope of this invention being limited only by the terms of the following claims.

I claim:

1. A system for mining mineral material from a bed of such material located in a well bore comprising
   means installed in said well bore for feeding liquid to said bed,
   elastic column means adapted to boring hard mineral material installed in said well bore,
   means for vibratorily driving said column means at a sonic frequency to develop sonic elastic wave energy therein,
   said sonic elastic wave energy being transferred from said column means to the liquid and mineral material in the side walls of said well bore in said bed so as to cause the mineral material to comminute from said bed and mix with the liquid to form a slurry, and
   means for bringing the slurry to the surface.

2. The system of claim 1 wherein the column means comprises conduit means, the means for bringing the slurry to the surface including check valve means installed in said conduit means, the sonic energy engendering pumping action of the valve means whereby the slurry is pumped up the conduit means out of the well bore.

3. The system of claim 1 wherein the means for feeding liquid to said bed comprises jet nozzle means for forming liquid jets which impinge against the mineral bed and engender the comminution thereof.

4. The system of claim 3 and further including means for rotating said jet nozzle means to comminute a fully circle of the well bore.

5. The system of claim 3 wherein the liquid feeding means additionally comprises conduit means installed in said well bore.

6. The system of claim 5 wherein the conduit means is vibrationally isolated from and free from the column means.

7. The system of claim 6 wherein the column means comprises second conduit means in external concentricity with said first mentioned conduit means.

8. The system of claim 7 wherein the means for bringing the slurry to the surface comprises fluid impelling means spaced along said second conduit means for sonically pumping the slurry out of the well bore.

9. The system of claim 6 wherein the second conduit means is in internal concentricity with the first conduit means.

10. The system of claim 1 wherein the sonic frequency at which the column means is driven is one which causes resonant standing wave vibration of said column means.

11. The system of claim 1 wherein the means for bringing the slurry to the surface comprises a second well bore proximate to said first mentioned bore, a tubing string in said second well bore, and sonic pump means installed in said tubing string.

12. A method for mining mineral material from a bed of such material comprising the steps of
    sonically driving a drive member into the ground to form a well bore running down to said bed of material,
    feeding water into said well bore to said bed of material, placing a conduit adapted to boring hard mineral material within said well bore, said conduit running down to said bed of material, and sonically driving said conduit so as to generate vibratory energy therein, said energy comminuting the bed material and being transferred to the water causing said material to mix with the water to form a slurry.

13. The method of claim 12 wherein the conduit has check valve means installed therein and further wherein the sonic energy causes pumping action of the valves so as to pump the slurry up the conduit and out of the well bore.

14. The method of claim 12 wherein water is fed into said well bore by impelling a liquid jet against the well bore walls to effect the comminution thereof.

15. The method of claim 14 and additionally including the step of slowly rotating the jet so as to comminute a full circumference of the well bore wall.

16. The method of claim 12 wherein the drive member is a casing.

17. The method of claim 12 wherein the conduit is driven at a frequency such as to set up resonant standing wave vibration thereof.

18. A system for mining mineral material from a bed of such material located in a well bore comprising
means installed in said well bore for feeding liquid to said bed,
conduit means installed in said well bore,
means for vibratorily driving said conduit means at a sonic frequency
cutting bar means pivotally suspended from the bottom portion of said conduit means, sonic energy being transferred from said conduit means to said bar means, the bar means abutting against the well bore walls in the region of the mineral bed,
sonic energy being transferred to the liquid and mineral material in the side walls of said well bore in said bed so as to cause the mineral material to comminute from said bed and mix with the liquid to form a slurry, and
means for bringing the slurry to the surface.

19. The system of claim 18 wherein the means for bringing the slurry to the surface comprises sonic pump means for pumping the slurry out of the well bore.

20. A system for mining mineral material from a bed of such material located in a well bore comprising
means installed in said well bore for feeding liquid to said bed,
conduit means installed in said well bore,
means for vibratorily driving said conduit means at a sonic frequency,
a shaft member having a passageway formed therein fixedly attached to the bottom end of said conduit means, said shaft member having a piston on the bottom end thereof, a cylinder in which said piston is slidably supported, a pair of cutter arms, and means for pivotally connecting the cutter arms to said cylinder, liquid in the well bore being forced downwardly through the passageway and driving said piston downwardly, thereby effecting relative upward motion of said cylinder and driving said cutter arms against the walls of the well bore.

21. A system for mining mineral material from a bed of such material located in a well bore comprising
means installed in said well bore for feeding liquid to said bed,
conduit means comprising a drill pipe installed in said well bore,
means for vibratorily driving said drill pipe at a sonic frequency comprising eccentric weight means fixedly mounted on said drill pipe and means for rotatably driving said drill pipe such that said pipe orbitally rotates around the bore hole wall, vibrational energy being generated in the conduit means by virtue of said eccentric weight means so as to vibrate said conduit against said wall,
sonic energy being transferred to the liquid and mineral material in the side walls of said well bore in said bed so as to cause the mineral material to comminute from said bed and mix with the liquid to form a slurry, and
means for bringing the slurry to the surface.

22. The system of claim 21 wherein the means for bringing the slurry to the surface comprises sonic pump means for pumping slurry out of the well bore.

23. The system of claim 21 wherein said eccentric weight means comprises a plurality of weight members mounted within said pipe in spaced positions therealong.

24. The system of claim 23 and further including rod means rotatably supported within said conduit means, the weight members being attached to the rod means, and means for rotatably driving the rod means independently of the conduit means to generate sonic energy in the conduit means.

25. The system of claim 24 and further including a side wall cutter means mounted on the drill pipe for facilitating cutting action against the side walls of the well bore.

26. The system of claim 21 wherein said eccentric weight means comprises a plurality of weight members mounted along the external wall of said pipe in spaced relationship to each other.

27. The system of claim 21 wherein said pipe is rotated at a speed such as to set up resonant standing wave vibration thereof.

28. The system of claim 21 and further including a universal coupler for coupling said drill pipe to said driving means to facilitate the orbital motion of the pipe around the bore hole wall.

29. The system of claim 21 wherein said eccentric weight means comprises rod means positioned eccentrically within said drill pipe, the position of the rod weight being adjustable by changing the circumferential position of the rod means within the conduit means.

30. A system for mining mineral material from a bed of such material located in a well bore comprising
means installed in said well bore for feeding liquid to said bed comprising first jet nozzle means for forming liquid jets which impinge against the mineral bed and engender the comminution thereof and a supply of pressurized air and second jet nozzle means for feeding the air upwardly against the slurry to effect pumping action,
conduit means installed in said well bore,
means for vibratorily driving said conduit means at a sonic frequency,
sonic energy being transferred to the liquid and mineral material in the side walls of said well bore in said bed so as to cause the mineral material to comminute from said bed and mix with the liquid to form a slurry, and
means for bringing the slurry to the surface.

31. A method for mining mineral material from a bed of such material comprising the steps of sonically driving a drill pipe into the ground to form a well bore running down to said bed of material, feeding water into said well bore to said bed of material, placing a conduit within said well bore, said conduit running down to said bed of material, and sonically driving said conduit so as to generate vibratory energy therein, whereby said energy comminutes the bed material causing said material to mix with the water to form a slurry.

32. A method for mining mineral material from a bed of such material comprising the steps of sonically driving a drive member into the ground to form a well bore running down to said bed of material, feeding water into said well bore to said bed of material, placing a conduit having check valve means installed therein within said well bore, said conduit running down to said bed of material, sonically driving said conduit so as to generate vibratory energy therein, and feeding pressurized air upwardly against the slurry, whereby said energy comminutes the bed material causing said material to mix with the water to form a slurry and simultaneously causing pumping action of the check valve means so as to pump the slurry up the conduit and out of the well bore, the upwardly fed pressurized air augmenting the pumping action.

33. The method of claim 32 and additionally including adding a foaming agent to the pressurized air to convert the slurry to a froth which can more easily be lifted out of the bore hole.

34. A method for mining mineral material from a bed of such material comprising the steps of sonically driving a drive member into the ground to form a well bore running down to said bed of material, feeding water into said well bore to said bed of material, placing a conduit within said well bore, said conduit running down to said bed of material, sonically driving said conduit so as to generate vibratory energy therein, and rotating and rolling said vibrating conduit around the side wall of said well bore with an oribtal motion, whereby said energy comminutes the bed material causing said materail to mix with the water to form a slurry.

* * * * *